(12) United States Patent  (10) Patent No.: US 9,151,924 B2
Balasubramaniam et al.  (45) Date of Patent: Oct. 6, 2015

(54) FIBER OPTIC SENSING APPARATUS AND METHOD FOR SENSING PARAMETERS INVOLVING DIFFERENT PARAMETER MODALITIES

(71) Applicant: General Electric Company, Schenectady, NY (US)

(72) Inventors: Mahadevan Balasubramaniam, Ballston Lake, NY (US); Glen Peter Koste, Niskayuna, NY (US); Slawomir Rubinsztajn, Ballston Spa, NY (US); Sachin Narahari Dekate, Niskayuna, NY (US); Anurag Kasyap Vejjupalle Subramanyam, Houston, TX (US); Sunilkumar Onkarnath Soni, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 53 days.

(21) Appl. No.: 13/968,578

(22) Filed: Aug. 16, 2013

(65) Prior Publication Data

US 2015/0049981 A1 Feb. 19, 2015

(51) Int. Cl.
*G02B 6/00* (2006.01)
*G02B 6/50* (2006.01)
*G01K 11/32* (2006.01)
*G01L 1/24* (2006.01)
*G01V 8/16* (2006.01)
*G02B 1/10* (2015.01)
*G01D 5/353* (2006.01)

(52) U.S. Cl.
CPC .............. *G02B 6/502* (2013.01); *G01D 5/3537* (2013.01); *G01D 5/35383* (2013.01); *G01K 11/3206* (2013.01); *G01L 1/242* (2013.01); *G01V 8/16* (2013.01); *G02B 1/10* (2013.01)

(58) Field of Classification Search
CPC .... G02B 6/502; G01K 11/3206; G01L 1/242; G01L 1/247; G01V 8/16
USPC ............................................. 385/12–13, 144
See application file for complete search history.

(56) References Cited

U.S. PATENT DOCUMENTS

| 5,194,847 | A | 3/1993 | Taylor |
| 5,355,208 | A | 10/1994 | Crawford et al. |
| 5,680,489 | A | 10/1997 | Kersey |

(Continued)

FOREIGN PATENT DOCUMENTS

| EP | 1110065 B1 | 6/2001 |
| WO | 2012028845 A1 | 3/2012 |

OTHER PUBLICATIONS

International Search Report and Written Opinion issued in connection with corresponding PCT Application No. PCT/US2014/050897 on Oct. 27, 2014.

(Continued)

*Primary Examiner* — Ryan Lepisto
(74) *Attorney, Agent, or Firm* — Jason K. Kilndtworth

(57) ABSTRACT

An optical-based sensing apparatus and method are provided. A sensing apparatus (10) may include a tube (30). An optical fiber (12) may be encased in the tube. A buffering layer (14) may be interposed between the optical fiber and the tube. The buffering layer and/or the tube may be selectively configured to form along a length of the apparatus a plurality of optical sensing zones (16, 18, 20) spatially arranged to sense parameters involving different parameter modalities.

23 Claims, 5 Drawing Sheets

(56) References Cited

U.S. PATENT DOCUMENTS

| | | |
|---|---|---|
| 5,698,848 A | 12/1997 | Belk |
| 5,754,293 A | 5/1998 | Farhadiroushan |
| 5,867,258 A | 2/1999 | Frederick et al. |
| 5,987,197 A | 11/1999 | Kersey |
| 6,195,162 B1 | 2/2001 | Varnham et al. |
| 6,285,806 B1 | 9/2001 | Kersey et al. |
| 6,305,227 B1 | 10/2001 | Wu et al. |
| 6,913,079 B2 | 7/2005 | Tubel |
| 7,082,079 B2 | 7/2006 | Woo |
| 7,142,736 B2 | 11/2006 | Patel et al. |
| 7,336,862 B1 | 2/2008 | Xai et al. |
| 8,047,285 B1 | 11/2011 | Smith |
| 8,074,713 B2 | 12/2011 | Ramos et al. |
| 2002/0025097 A1 | 2/2002 | Cooper et al. |
| 2002/0041722 A1 | 4/2002 | Johnson et al. |
| 2002/0041723 A1* | 4/2002 | Ronnekleiv et al. ............ 385/12 |
| 2002/0041724 A1 | 4/2002 | Ronnekleiv et al. |
| 2003/0227097 A1 | 12/2003 | Girardon et al. |
| 2006/0115204 A1 | 6/2006 | Marsh et al. |
| 2006/0233485 A1 | 10/2006 | Allen |
| 2007/0280605 A1 | 12/2007 | Mendoza |
| 2008/0137711 A1 | 6/2008 | Gleitman |
| 2010/0074572 A1 | 3/2010 | Zheng et al. |
| 2010/0134783 A1 | 6/2010 | Omichi et al. |
| 2010/0200744 A1 | 8/2010 | Pearce et al. |
| 2010/0277329 A1 | 11/2010 | Worzyk |
| 2011/0149293 A1 | 6/2011 | Dorner |
| 2011/0311179 A1 | 12/2011 | Greenaway |
| 2012/0091364 A1 | 4/2012 | McStay et al. |
| 2012/0179390 A1 | 7/2012 | Kimmiau et al. |
| 2013/0090867 A1 | 4/2013 | Strong |

OTHER PUBLICATIONS

Shatalin et al., "Interferonnetric Optical Time-Domain Reflectometry for Distributed Optical-Fiber Sensing," Applied Optics, pp. 5600-5604, vol. 37, Issue 24, 1998.

Juarez., "Distributed Fiber Optic Intrusion Sensor System for Monitoring Long Perimeters", PhD dissertation, Texas A&M University, pp. 1-84, Aug. 2005.

* cited by examiner

FIBER OPTIC SENSING APPARATUS AND METHOD FOR SENSING PARAMETERS INVOLVING DIFFERENT PARAMETER MODALITIES

FIELD

Aspects of the present invention relate generally to fiber optics sensing, and, more particularly, to a sensing apparatus and method based on fiber optics, which may be adapted to sense multiple parameters, as may involve different parameter modalities

BACKGROUND

Certain types of structural assets, such as may be used in industry for the transportation of a commodity through a pipeline, may extend over relatively long distances (e.g., hundreds of kilometers or more). Since such structural assets may be subject to variable physical conditions (e.g., temperature, mechanical stress, pressure) or may develop malfunctions (e.g., ruptures) anywhere along its length, it is desirable to provide the ability to reliably and cost-effectively monitor/sense various parameters along the length of the asset. Other industrial assets which may require monitoring of variable physical conditions may be deployed at multiple sites over a relatively large geographical area, such as subsea locations, wind energy farms, solar farms, etc. Notwithstanding of advances which have been made in this technical field, there continues to be a need for improved apparatus and/or techniques useful for reliably and cost-effectively monitor/sensing various parameters along the length of the asset.

SUMMARY

Generally, aspects of the present invention in one non-limiting embodiment may provide a method which allows providing an optical fiber. The method further allows disposing a buffering layer around the optical fiber, and selectively configuring the buffering layer to form a plurality of optical sensing zones spatially arranged along a length of the optical sensing apparatus to sense parameters comprising different parameter modalities.

Further aspects of the present invention, in another non-limiting embodiment may provide an optical-based sensing apparatus including a tube and an optical fiber encased in the tube. A buffering layer may be interposed between the optical fiber and the tube. The buffering layer and/or the tube may be selectively configured to form along a length of the apparatus a plurality of optical sensing zones spatially arranged to sense parameters involving different parameter modalities.

BRIEF DESCRIPTION OF THE DRAWINGS

A more particular description briefly stated above will be rendered by reference to specific embodiments thereof that are illustrated in the appended drawings. Understanding that these drawings depict only typical embodiments and are not therefore to be considered to be limiting of its scope, the embodiments will be described and explained with additional specificity and detail through the use of the accompanying drawings in which.

DETAILED DESCRIPTION

Figure 1:
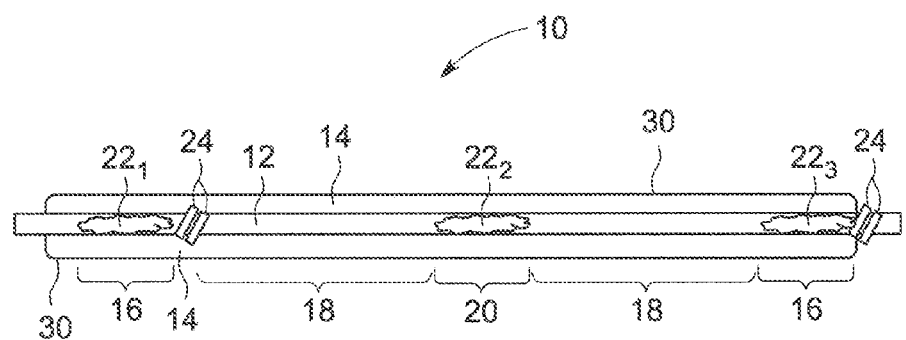
FIG. 1 is a schematic representation of one non-limiting embodiment of an optical-based sensing apparatus embodying aspects of the present invention.

The present inventors have recognized a need for further improvements in connection with distributed fiber optic sensing and propose an elegant and clever approach, where a plurality of optical sensing zones may be spatially arranged along a length of an optical-based sensing apparatus (e.g., sensing cable) to sense parameters comprising different modalities. This may be achieved with a common optical fiber (e.g., a single optical fiber) in lieu of a multi-fiber approach. Though the fiber may be a single physical element throughout the length of the sensing apparatus, as will be described in greater detail below, one or more properties of one or more elements, which may mechanically interact (directly or indirectly) with the fiber (e.g., a buffering layer around the fiber, an encasing tube) may be selectively configured (e.g., engineered) to tune a sensitivity of a respective sensing zone to a respective parameter. For example, for strain sensing the fiber should be tightly coupled with surrounding structures to be sufficiently responsive to a strain stimulus, while for acoustic and/or temperature sensing, by way of comparison, the fiber should be relatively more compliant (e.g., sufficiently strain-relieved for temperature measurement) to be appropriately responsive to the acoustic and temperature stimuli.

Embodiments are described herein with reference to the attached figures wherein like reference numerals are used throughout the figures to designate similar or equivalent elements. The figures are not drawn to scale and they are provided merely to illustrate aspects disclosed herein. In the following detailed description, numerous specific details are set forth in order to provide a thorough understanding of various embodiments of the present invention. However, those skilled in the art will understand that embodiments of the present invention may be practiced without these specific details, that the present invention is not limited to the depicted embodiments, and that the present invention may be practiced in a variety of alternative embodiments. In other instances, to avoid pedantic and unnecessary description well known methods, procedures, and components have not been described in detail.

Furthermore, various operations may be described as multiple discrete steps performed in a manner that is helpful for understanding embodiments of the present invention. However, the order of description should not be construed as to imply that these operations need be performed in the order they are presented, nor that they are even order dependent. Moreover, repeated usage of the phrase "in one embodiment" does not necessarily refer to the same embodiment, although it may. Lastly, the terms "comprising", "including", "having", and the like, as used in the present application, are intended to be synonymous unless otherwise indicated.

FIG. 1 is a schematic representation of one non-limiting embodiment of an optical-based sensing apparatus 10 including an optical fiber 12. A buffering layer 14 may be disposed around optical fiber 12 and may be encased in a tube 30. In one non-limiting embodiment, buffering layer 14 may be selectively configured to form a plurality of optical sensing zones 16, 18, 20 spatially arranged along a length of the optical sensing apparatus to sense parameters comprising different parameter modalities. In one non-limiting embodiment, buffering layer 14 may be selectively configured so that at least one property of the buffering layer may vary along the length of sensing apparatus 10 to tune a sensitivity of a respective sensing zone to a respective parameter. Non-limiting examples of properties of buffering layer 14 which may selectively configured may be a property of a buffering layer material (e.g., a modulus of elasticity (also known as Young's Modulus) of the buffering layer material), a geometry of the buffering layer (e.g., a thickness of the buffering layer), or combinations of such properties.

Figure 2:
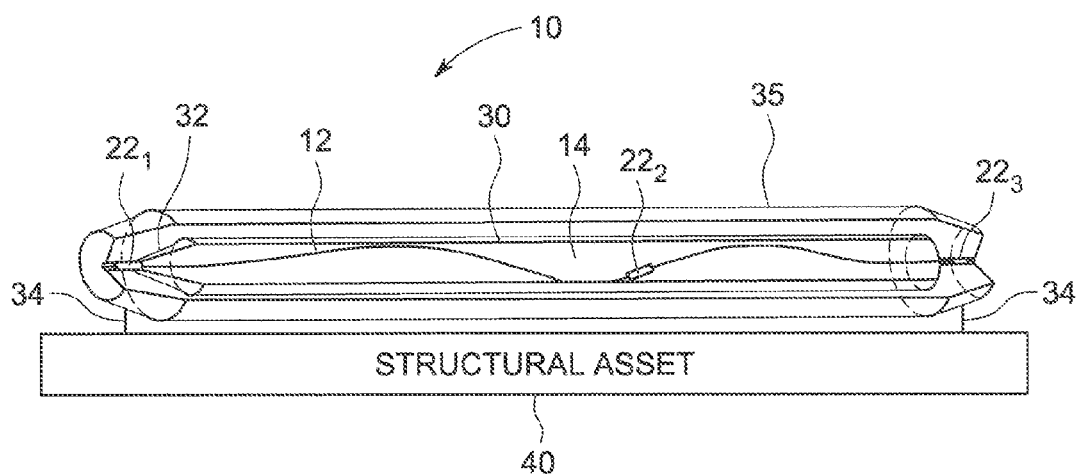
FIG. 2 is an isometric view of one non-limiting embodiment of an optical-based sensing apparatus embodying aspects of the present invention, as may be attached to a structural asset being monitored by the sensing apparatus.

Tube 30, which encases optical fiber 12 and buffering layer 14 may be housed in an outer jacket 35 (FIG. 2), which may be affixed onto a structural asset 40 (FIG. 2) for monitoring parameters of interest in connection with the asset. One example of structural asset 40 may be a pipeline. It will be appreciated, however, that a broad range of categories of assets in a variety of diverse applications may benefit from aspects of the present invention, such as assets in the realm of civil engineering (e.g., building structures, bridge structures, tunnel structures, water control structures, etc.); assets in the realm of subsea applications (e.g., subsea umbilicals, risers, flowlines, etc., commonly referred to as SURF); assets in the realm of energy production (e.g., wind energy farms, solar power farms, nuclear power plants; assets in the realm of transportation (air and marine vessels, trains, etc.); assets in the realm of intrusion sensing. The foregoing should be construed in an example sense and not in a limiting sense being that any application which may involve monitoring of parameters over many locations may benefit from aspects of the present invention.

In one non-limiting embodiment, optical fiber 12 may include at least two sites having a respective fiber grating, such as fiber Bragg gratings (FBG) $22_1$, $22_2$, $22_3$ as may be arranged to have a respective optical response in a wavelength spectrum with a distinguishing feature, which, for example, may be indicative of a value of a respective local parameter at a respective grating site. Non-limiting examples of local parameters which could be measured at the grating site due to local effects—which in one non-limiting example may depend on how the grating site is packaged or otherwise interacts with buffering layer 14—may include strain, temperature, acceleration, pressure, chemistry. As will be appreciated by one skilled in the art, various types of FBGs (e.g., chirped FGBs 24) may be used depending on the needs of a given application. See for example, apparatus and techniques described in U.S. patent application Ser. No. 13/678,979, filed on Nov. 16, 2012, titled "Fiber Optic Sensing Apparatus Including Fiber Gratings and Method for Sensing Parameters Involving Different Parameter Modalities", which is herein incorporated by reference.

The respective fiber grating $22_1$, $22_2$, $22_3$ gratings, may be further arranged to form, in combination with a respective portion of the optical fiber which extends between the grating sites, respective optical backscatter portions that when combined with one another are effective to sense an optical change in the fiber portion between the sites, which may indicate a value of a distributed parameter, such as dynamic strain, dynamic pressure, an acoustic signal, etc. It will be appreciated that this is a parameter modality (e.g., distributed over the fiber portion between the sites and which could involve up to tens of KHz variation) different from the parameter modality of the respective local parameters sensed at the respective grating sites, which may involve relatively slowly varying parameters. Thus, a local parameter may refer to a parameter for measurement of a local effect at the grating site; and a distributed parameter may refer to a parameter for measurement of an effect in the fiber portion between the sites. For example, sensing zones 16 may be respective zones of sensing apparatus 10 for sensing strain; sensing zones 18 may be respective zones of sensing apparatus 10 for sensing acoustic signals; and sensing zone 20 may be a zone of sensing apparatus 10 for sensing temperature. It will be appreciated that the illustrated sensing zone arrangement should be construed in an example sense and not in a limiting sense since the specific spatial arrangement of such sensing zones may be readily tailored to the needs of any given application.

In one non-limiting embodiment, tube 30 may be selectively configured along the length of the optical sensing apparatus to tune (by itself or in combination with buffering layer 14) the sensitivity of a respective sensing zone to a respective parameter. Non-limiting examples of properties of tube 30 which may selectively configured may be a property of a tube material, (e.g., an acoustic impedance of a tube material over a given segment of the tube), a geometry of the tube (e.g., a varying inner diameter of the tube), or combinations of such properties. In one non-limiting embodiment, one or more segments of tube 30 may be crimped (e.g., thermo-mechanically or mechanically crimped) so as to further tune a sensitivity of a respective sensing zone to a respective parameter. For example, as may be appreciated in FIG. 2, segments 32 of tube 30 may be crimped, which may be effective for sensing strain proximate locations 34, where, for example, respective mechanical attachments to structural asset 40 (e.g., a riser, etc.) may be provided.

Figure 3:
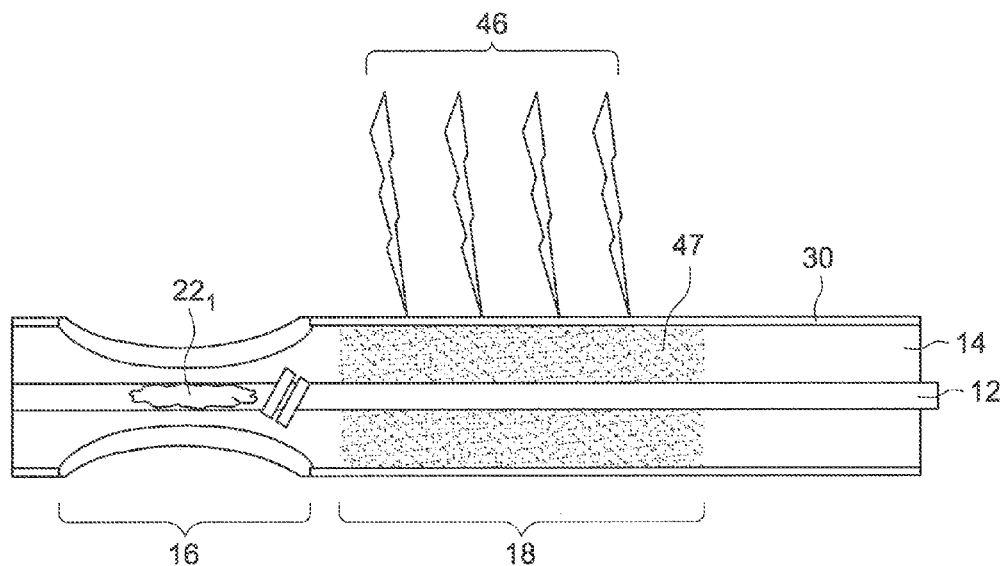
FIG. 3 is a schematic representation in part illustrating one non-limiting example of a manufacturing process for an optical-based sensing apparatus embodying aspects of the present invention.

Referring to FIG. 3, in one non-limiting embodiment, tube 30 may comprise a thermo-plastic material (e.g., any of various thermo-plastic polymers) and buffering layer 14 may comprise any of various gels or resins. Non-limiting examples may be hydrocarbon gels, silicone gels, fluoropolymer gels, etc. In one non-limiting embodiment, buffering layer may be a reactive gel or reactive resin responsive to an appropriate modality of excitation (conceptually represented by rays 46), which may be applied during a process for manufacturing a sensing apparatus embodying aspects of the present invention to, for example, effect a cross-linking (conceptually represented by dotted portion 47) in the reactive gel or reactive resin. Non-limiting examples of reactive resins may be thermo-set resins, room temperature curable resins including two-part curable resins, ultraviolet or electron-beam curable resins. Non-limiting examples of excitation modalities which may be utilized may be thermal irradiance, electron-beam or gamma irradiance, microwave irradiance, etc. In one non-limiting example, the resulting crosslinking may be arranged to meet a desired value for the elastic modulus of the gel or resin, which may comprise buffering layer 14. In one non-limiting example, certain segments of tube 30 may be masked and other segments of tube 30 may be selectively irradiated with the appropriate excitation modality to harden the gel or resin to, for example, increase acoustic sensitivity in acoustic sensing zone 18. As suggested above, one may apply mechanical pressure at a temperature above a softening point of the thermoplastic material of tube 30 to deform (e.g., thermo-mechanically crimp) tube 30 around the optical fiber and, for example, increase sensitive to strain in zone 16.

Figure 4:
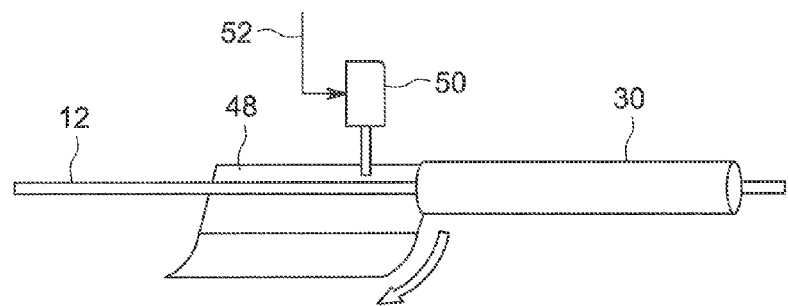
FIG. 4 is a schematic representation illustrating another non-limiting example of a manufacturing process for an optical-based sensing apparatus embodying aspects of the present invention.

FIG. 4 is a schematic representation of one non-limiting example, which may be utilized for selectively introducing a desired buffering layer material during a process for manufacturing a sensing apparatus embodying aspects of the present invention. In one non-limiting embodiment, the encasing tube may be formed from a sheet 48, which may be successively rolled to eventually form tube 30. At least one injector 50 may be selectively controlled in response to a suitable control signal 52 generated by an injector controller (not shown) to deliver the desired buffering layer material, (e.g., gel or resin) as the tube is being formed around fiber 12. In one non-limiting embodiment, injector 50 may be pulsed at a variable rate to selectively vary a distribution of buffering layer material, as such material may be deposited onto one or more sections of sheet 48. This distribution of buffering layer material may be selected to achieve a desired spatial property in the buffering layer, which in turn may contribute to achieve a desired sensitivity of a respective sensing zone to a respective parameter.

Figure 5:
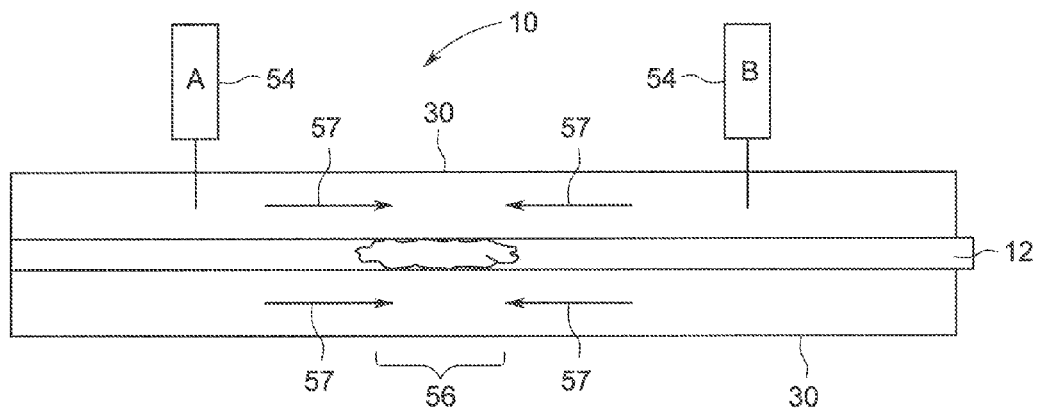
FIG. 5 is a schematic representation illustrating a further non-limiting example of a manufacturing process for a non-limiting embodiment of an optical-based sensing apparatus embodying aspects of the present invention.

Referring to FIG. 5, in one non-limiting example of a manufacturing process, at least respective portions of the interior of tube 30 containing fiber 12 may be injected with two-part curable resins, which may be injected by way of respective injectors 54 (e.g., hypodermic injectors) on opposed sides of a respective sensing zone 56. Injectors 54 are respectively labeled with the letters A and B to conceptualize their respective content of a two-part curable resin. In one non-limiting example, as the two-part curable resins mix with one another and react, (conceptually represented by opposed arrows 57) a resulting mixture may be configured to selectively harden at zone 56 to impart the desired material property to sensing zone 56. It will be appreciated that an alternative implementation may involve injection by way of a single injector of a premixed two-part curable resin into zone 56.

Figure 6:
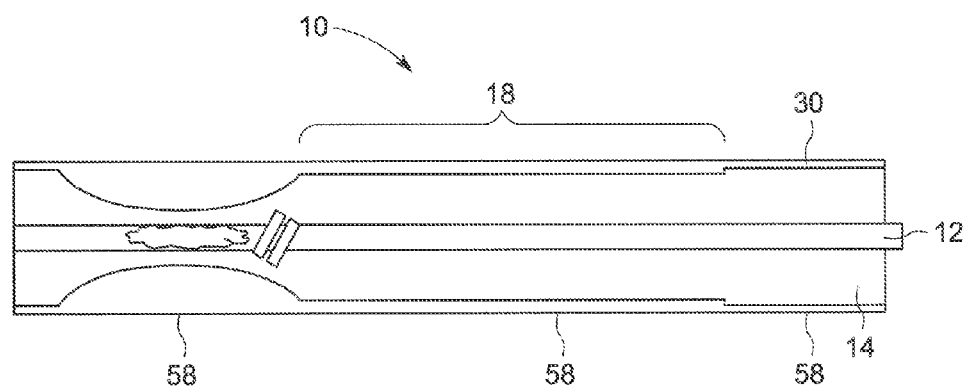
FIG. 6 is a schematic representation of one non-limiting embodiment of an optical-based sensing apparatus embodying aspects of the present invention.

Referring to FIG. 6, in one non-limiting embodiment, one or more geometric variations 58 may be imparted to various inner surfaces of tube 30 (e.g., thickness variations which vary the inner diameter of tube 30), and may be spatially arranged along the length of sensing apparatus 10 to attain a desired parameter sensitivity in the respective sensing zones of sensing apparatus 10. In one non-limiting example, etching may be one technique to implement geometric variations 58. It will be appreciated that a tube 30 having geometric variations 58 in turn cooperates to form a buffering layer 14 having varying thicknesses. For example, thinner sections may be used to enhance strain transfer whereas relatively thicker sections may be used to enhance acoustic and/or temperature sensing. It will be appreciated that if one opted to use this technique (in lieu of the crimping technique described above) there may not be a need to apply pressure/temperature to modify the geometry of tube 30. Additionally, the outer diameter of tube 30 may remain practically constant along its entire length.

In a further non-limiting example, one or more properties of the tube material may be selectively arranged along the length of sensing apparatus 10 to attain a desired sensitivity for the respective optical sensing zones of the sensing apparatus. For example, to enhance a signal-to-noise ratio in an acoustic sensing zone 18 of sensing apparatus 10, one may select for such a zone of tube 30, a tube material having acoustic impedance which matches or approximates the acoustic impedance of the surrounding environment. For example, this would be conducive to reduced acoustic reflections. In one non-limiting example, to avoid abrupt discontinuities, a gradual change of acoustic impedance may be implemented by way of a coating comprising a graded epoxy or gel.

Figure 7:
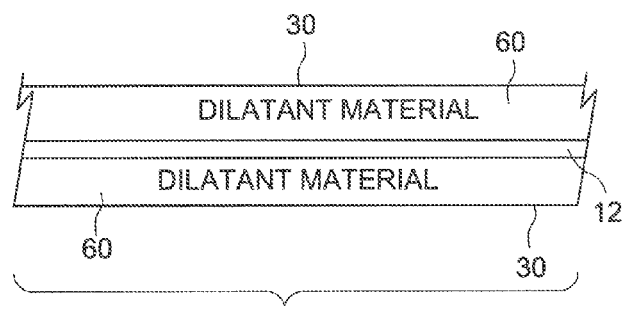
FIG. 7 is a schematic representation of one non-limiting embodiment of an optical-based sensing apparatus embodying aspects of the present invention.

Referring to FIG. 7, in one non-limiting embodiment, the buffering layer around fiber 12 may comprise a dilatant material 60. As will be appreciated by one skilled in the art, dilatant materials belong to the class of non-Newtonian fluids, which, for example, can exhibit a significant increase in viscosity in response to an increase of a shear rate. These materials may behave as a flowable viscous fluid when exposed to relatively low shear rates, and behave as a solid-like material when exposed to relatively high shear rates. Non-limiting examples of such materials may include a mixture of silanol stopped silicone oil with boric acid (so called "Silly Putty"); or a dispersion of silica nano-particles in poly(ethylene glycol). It is contemplated that this implementation could facilitate a transfer of fast-acting strains from tube 30 to a respective sensing zone 62 of sensing apparatus 10. Additionally, the properties of such a dilatant material may provide enhanced mechanical protection to optical fiber 12 in the presence of a sudden impact.

One non-limiting example contemplates that fiber 12 may be selectively overstuffed [this may be conceptualized to selectively introducing extra fiber length (e.g., an undulated fiber will have extra length compared to a straight fiber) within a given portion of the buffering layer (e.g., gel), which introduces slack (strain relief) within the given portion] to tune a sensitivity of a respective sensing zone to a respective parameter. For example, sensing zones 18 and 20 (for acoustic and temperature sensing, respectively) located between strain sensing locations 16 in FIG. 1 may be sensing zones which could benefit from fiber overstuffing (e.g., benefit from the resulting strain relief). In one non-limiting example, the overstuffing may be implemented in the form of a relatively loose spiral and the degree of overstuffing (e.g., percentage) may depend on the maximum strain that a given sensing zone may expect during operation. For example, an overstuffed fiber portion may be able to be more sensitive to acoustic stimuli while being practically immune to strain inputs over such portion of the fiber. A further non-limiting example may be conceptualized as establishing a characterizable and controllable bond (e.g., characterizable and controllable slippage) between the fibers and surrounding elements (e.g., outer tube and/or buffering layer). If the amount of such slippage is appropriately set, (e.g., relatively tight versus moderately tight) one need not employ fully loose fiber portions, which may improve the reliability of the sensing apparatus.

Figure 8:
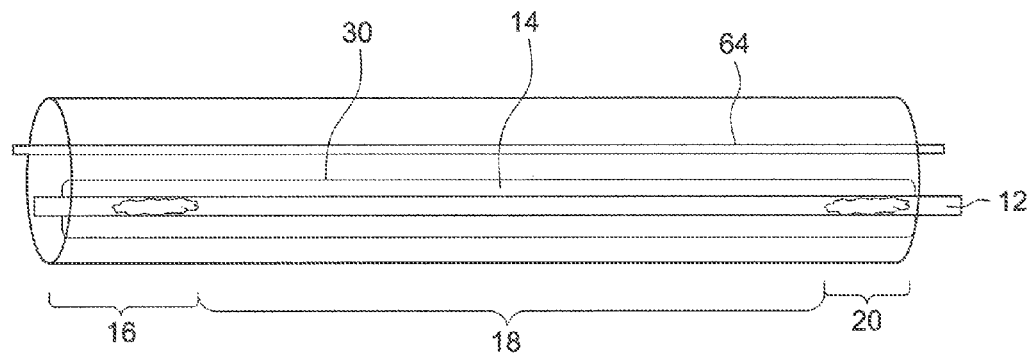
FIG. 8 is a schematic representation of an optical-based sensing apparatus embodying aspects of the present invention regarding a non-liming example of a post-manufacturing approach for identifying various optical sensing zones in the sensing apparatus.

The present inventors have further recognized that once a sensing apparatus (e.g., sensing cable) embodying aspects of the present invention has been manufactured, there may be a need to identify in a reliable and straightforward manner the various sensing zones of the sensing apparatus. For example, such identification would be particularly useful to personnel installing the sensing apparatus onto a given structural asset to be monitored by the sensing apparatus. Referring to FIG. 8, a means for identifying along the length of sensing apparatus 10 the respective optical sensing zones 16, 18, 20 may be integrated in sensing apparatus 10. In one non-limiting embodiment, at least one heater element 64 (e.g., heater strand) may be disposed along the length of apparatus 10. In operation, heater element 64 may be configured to induce a thermal response indicative of the respective types of optical sensing zones. For example, since one or more properties of buffering layer 14 are selectively configured to tune a sensitivity of a respective sensing zone to a respective parameter, then the thermal response of such sensing zones 16, 18, 20 would be different and this may be used to identify the optical sensing zones constructed in the sensing apparatus.

Figure 9:
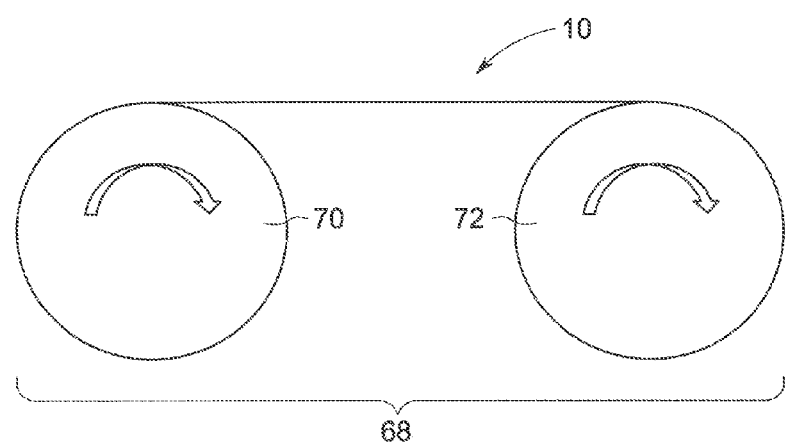
FIG. 9 is a schematic representation for conceptualizing a non-liming example of another post-manufacturing approach for identifying various optical sensing zones in the sensing apparatus.

In one non-limiting embodiment, as shown in FIG. 9, the means for identifying the optical sensing zones may comprise a spooling device 68, which may include a supplying spool 70 and a receiving spool 72 arranged to transport (e.g., involving rotation-to-translation) of one or more sensing apparatuses 10 (e.g., one or more sensing cables), and this can induce a change in a strain response indicative of the optical sensing zones. For example, as sensing apparatus 10 is being rolled from spool 70 to spool 72, the various sensing locations will be sequentially transitioned from practically zero strain (e.g., while the cable is translated between the two spools, the cable is straight and practically free from strain) to a certain level of stress (e.g., the cable will bend and experience strain depending on how much displaced the fiber is from neutral axis as the cable is being rolled onto receiving spool 72) due to the circular geometry of the spools.

Figure 10:
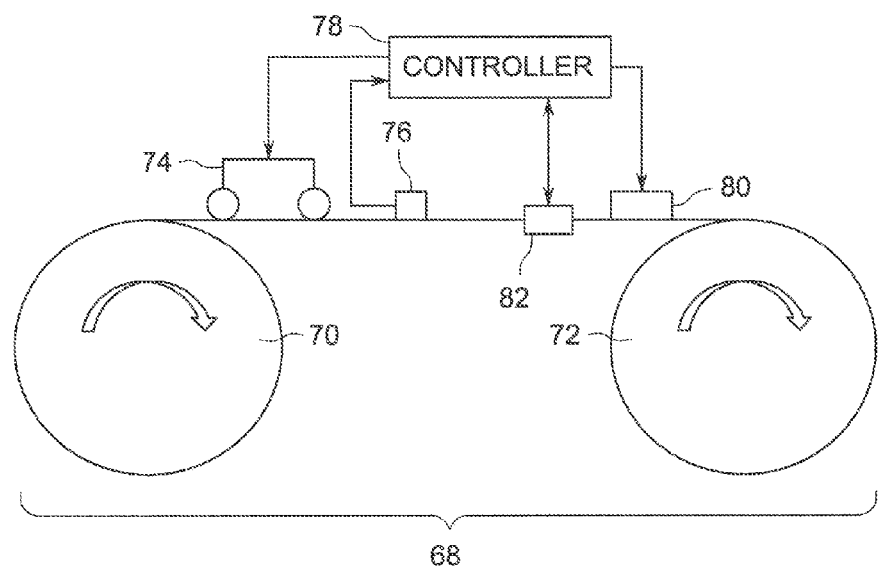
FIG. 10 is a schematic representation for conceptualizing a non-liming example of still another post-manufacturing approach for identifying various optical sensing zones in the sensing apparatus.

In one non-limiting embodiment, as shown in FIG. 10, a tensioner 74 may be disposed on a straight portion of sensing cable 10 between spools 70, 72. Tensioner 74 may be arranged to apply a known level of tension, at least over a short stretch of cable. As cable 10 is spooled across tensioner 74, a change in response to the applied tension may be sensed by instrumentation 76, which may be electrically coupled to a controller 78, where the sensed change in turn may be configured to automatically trigger a command to a marking device 80 arranged to externally-mark the sensing zones of sensing cable 10, such as by coloring or placing an appropriate mark on an outward surface of the cable. In one non-limiting embodiment, a chamber or container 82 may be provided subsequent tensioner 74 or by itself. Chamber 82 may be held at a known temperature and/or may be acoustically stimulated for detecting thermal and/or acoustically sensing zones of the cable. If optionally desired, rewinding and forwarding of the cable may be iteratively performed around an initially detected FBG location to obtain multiple measurements, which may then be averaged and in turn may be effective to pin-point such a location with a higher level of accuracy.

Thus, it should be now appreciated that in one non-limiting embodiment, a device (e.g., heater element 64, spooling device 70, 72, tensioner 74, etc.) may be arranged to apply a stimulus to the sensing apparatus. Appropriate instrumentation (e.g., instrumentation 76, an interrogator (not shown) operatively coupled to the sensing apparatus) may be arranged to sense a response to the applied stimulus, which response is indicative of respective locations of the sensing zones along the length of the sensing apparatus. A device (e.g., marking device 80) may be arranged to mark an outward surface of the sensing apparatus in response to the sensed response. For example, respective marks may be arranged to identify the respective locations of the sensing zones along the length of the sensing apparatus.

Figure 11:
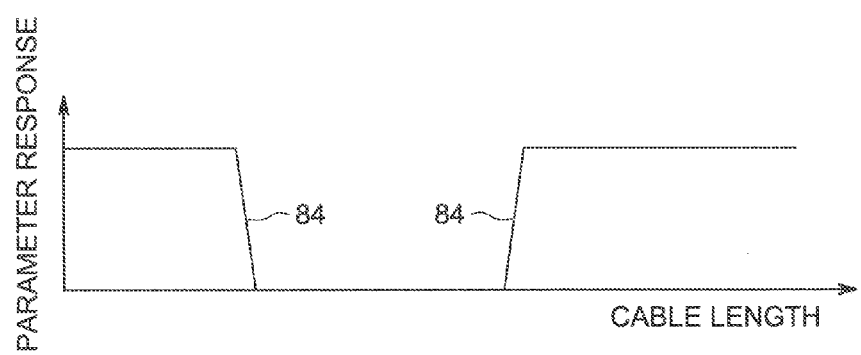
FIG. 11 is a plot illustrating a conceptual parameter response, which may be useful for identifying the various optical sensing zones post-manufacturing of the sensing apparatus.

FIG. 11 is a plot of a conceptual measurable parameter response (e.g., temperature, strain, tension, etc.) as a function of cable length where a sequence of parameter transition locations 84 may be used to, for example, identify sensing zones (e.g., FBG sites, etc.) disposed along the length of the sensing apparatus.

While aspects of the present invention have been described with reference to various embodiments, it will be understood by those skilled in the art that various changes, omissions and/or additions may be made and equivalents may be substituted for elements thereof without departing from the spirit and scope of the embodiments. In addition, many modifications may be made to adapt a particular situation or material to the teachings of the embodiments without departing from the scope thereof. Therefore, it is intended that the invention be limited only by the spirit and scope of the appended claims.

The invention claimed is:

1. In an optical-based sensing apparatus, a method comprising:
   providing an optical fiber;
   disposing a buffering layer around the optical fiber; and
   selectively configuring the buffering layer by selectively injecting at least one resin to form at least one of a plurality of optical sensing zones spatially arranged along a length of the optical sensing apparatus to sense parameters comprising different parameter modalities.

2. The method of claim 1, wherein the buffering layer comprises a gel or resin, and the method further comprises irradiating the gel or resin to meet a desired value for said at least one property.

3. The method of claim 1, wherein the injecting of the at least one resin comprises injecting at least two reactive resins to form the at least one optical sensing zone.

4. The method of claim 1, wherein the disposing of the buffering layer comprises depositing a dilatant material around the fiber to form the buffering layer.

5. The method of claim 1, further comprising a tube to encase the buffering layer and the optical fiber therein, and the method further comprises selectively configuring the tube along the length of the optical sensing apparatus to further tune the sensitivity of the respective sensing zone to the respective parameter.

6. The method of claim 5, wherein the configuring of the tube comprises crimping at least one segment of the tube.

7. The method of claim 1, wherein the parameters are selected from the group consisting of strain, temperature, pressure, dynamic strain, dynamic pressure and an acoustic signal.

8. The method of claim 1, further comprising identifying along the length of the sensing apparatus the optical sensing zones.

9. The method of claim 8, wherein the identifying comprises applying a stimulus to the sensing apparatus and sensing a response indicative of the optical sensing zones.

10. The method of claim 9, wherein the applied stimulus is selected from the group consisting of temperature, strain, tension, sound and combinations of said stimuli.

11. The method of claim 9, further comprising marking an outward surface of the sensing apparatus in response to the sensed response, wherein the marking is arranged to identify the optical sensing zones along the length of the sensing apparatus.

12. The method of claim 1, further comprising affixing the sensing apparatus to a structural asset.

13. The method of claim 12, wherein the structural asset is selected from the group consisting of a subsea umbilical, a riser and a flowline.

14. The method of claim 1, further comprising arranging in the optical fiber at least two sites having a respective fiber grating.

15. An optical-based sensing apparatus comprising:
a tube;
an optical fiber encased in the tube; and
a buffering layer interposed between the optical fiber and the tube, the buffering layer and/or the tube selectively configured to form along a length of the apparatus a plurality of optical sensing zones spatially arranged to sense parameters comprising different parameter modalities, wherein the buffering layer comprises at least one resin injected to form at least one of the plurality of optical sensing zones and at least one respective property of the buffering layer and/or at least one respective property of the tube is varied along the length of the optical sensing apparatus to tune a sensitivity of a respective sensing zone to a respective parameter.

16. The apparatus of claim 15, wherein the at least one resin comprises at least two reactive resins, which react to form the at least one optical sensing zone.

17. The apparatus of claim 15, wherein the buffering layer comprises a dilatant material.

18. The apparatus of claim 15, further comprising a device arranged to apply a stimulus to the sensing apparatus, and further comprising instrumentation to sense a response to the applied stimulus, the response being indicative of respective locations of the sensing zones along the length of the sensing apparatus.

19. The apparatus of claim 18, further comprising a device arranged to mark an outward surface of the sensing apparatus in response to the sensed response, wherein respective marks are arranged to identify the respective locations of the sensing zones along the length of the sensing apparatus.

20. A structural asset comprising the apparatus of claim 15.

21. The apparatus of claim 20, wherein the structural asset is selected from the group consisting of a subsea umbilical, a riser and a flowline.

22. The apparatus of claim 15, wherein the optical fiber comprises at least two sites having a respective fiber grating.

23. An optical-based sensing apparatus comprising:
a tube;
an optical fiber encased in the tube;
a buffering layer interposed between the optical fiber and the tube, the buffering layer and/or the tube selectively configured to form along a length of the apparatus a plurality of optical sensing zones spatially arranged to sense parameters comprising different parameter modalities, wherein at least one respective property of the buffering layer and/or at least one respective property of the tube is varied along the length of the optical sensing apparatus to tune a sensitivity of a respective sensing zone to a respective parameter; and
at least one heater element disposed along the length of the apparatus configured to induce a thermal response indicative of the optical sensing zones.

* * * * *